United States Patent
Nakamura et al.

(10) Patent No.: US 8,888,868 B2
(45) Date of Patent: Nov. 18, 2014

(54) METHOD FOR PRODUCING COMPOSITE CARBON FIBERS

(71) Applicant: Showa Denko K.K., Tokyo (JP)

(72) Inventors: Takeshi Nakamura, Tokyo (JP); Ryuji Yamamoto, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/934,327

(22) Filed: Jul. 3, 2013

(65) Prior Publication Data

US 2014/0010749 A1    Jan. 9, 2014

Related U.S. Application Data

(60) Provisional application No. 61/672,691, filed on Jul. 17, 2012.

(30) Foreign Application Priority Data

Jul. 3, 2012  (JP) ................................. 2012-150033

(51) Int. Cl.
| | | |
|---|---|---|
| *C01B 31/14* | (2006.01) | |
| *D06M 10/00* | (2006.01) | |
| *C01B 31/02* | (2006.01) | |
| *D01G 13/00* | (2006.01) | |
| *H01M 10/052* | (2010.01) | |
| *D02G 3/04* | (2006.01) | |

(52) U.S. Cl.
CPC ........... *C01B 31/0253* (2013.01); *D06M 10/00* (2013.01); *D01G 13/00* (2013.01); *H01M 10/052* (2013.01); *D02G 3/04* (2013.01)
USPC .......................................... 23/314; 23/313 R

(58) Field of Classification Search
USPC ................. 23/314, 313 R, 295 R, 293 R
See application file for complete search history.

(56) References Cited

U.S. PATENT DOCUMENTS

| | | |
|---|---|---|
| 2010/0189628 A1 | 7/2010 | Schimpf |
| 2011/0163274 A1 | 7/2011 | Plee et al. |
| 2011/0204296 A1 | 8/2011 | Conzen et al. |
| 2012/0171566 A1 | 7/2012 | Yoshitake et al. |
| 2012/0214070 A1 | 8/2012 | Yamamoto et al. |

FOREIGN PATENT DOCUMENTS

| | | |
|---|---|---|
| JP | 2006-016222 A | 1/2006 |
| JP | 2010-083722 A | 4/2010 |
| JP | 2010-173884 A | 8/2010 |
| WO | 2006/137893 A2 | 12/2006 |
| WO | 2011/002222 A2 | 1/2011 |
| WO | 2013/049939 A1 | 4/2013 |

OTHER PUBLICATIONS

Anonymous, ""Analog Cell Disruptor | Sonifiers | Liquid Processing | Products | Branson"", Jan. 1, 2013, XP055095670, Retrieved from the Internet: URL:http://www.emersonindustrial.com/en-us/branson/products/sonifiers/analog-cell-disruptor/Pages/default.aspx [retrieved on Jan. 10, 2014].
European Search Report dated Jan. 15, 2014, issued by the European Patent Office in corresponding European Application No. 13 17 4776.

*Primary Examiner* — Edward Johnson
(74) *Attorney, Agent, or Firm* — Sughrue Mion, PLLC

(57) ABSTRACT

An object of the present invention is to provide a method for producing composite carbon fibers in which two or more carbon fibers are dispersed in a nearly homogenous state, the composite carbon fibers capable of being easily dispersed in a matrix such as a resin without leaving aggregate, and imparting low resistance. Disclosed is a method for producing composite carbon fibers, which comprises imparting a cavitation effect to slurry containing 6% by mass or less of two or more carbon fibers each having a different average fiber diameter under a pressure of 100 MPa or more and less than 245 MPa thereby to form a composite.

7 Claims, 4 Drawing Sheets

METHOD FOR PRODUCING COMPOSITE CARBON FIBERS

This application claims priority under 35 U.S.C. sect. 119 (e) on U.S. Provisional Application No. 61/672,691 filed on Jul. 17, 2012 and under 35 U.S.C. sect. 119(a) on Patent Application No. 2012-150033 filed in Japan on Jul. 3, 2012, the entire contents of which are hereby incorporated by references.

TECHNICAL FIELD

The present invention relates to a method for producing composite carbon fibers. More particularly, the present invention relates to a method for producing composite carbon fibers in which two or more carbon fibers are dispersed in a nearly homogenous state, the composite carbon fibers being excellent in the effect capable of being easily dispersed in a matrix such as a resin without leaving aggregate, and imparting low resistance.

BACKGROUND ART

It has been known that the addition of a filler to a matrix such as a resin imparts properties such as electric conductivity, thermal conductivity and antistatic properties. Since some carbon fibers exhibit high conductivity, the effect of imparting electric conductivity can be expected. For example, Patent Document 1 discloses that an electrode for a lithium ion battery is allowed to contain a fibrous carbon having a diameter of less than 100 nm, and a fibrous carbon having a diameter of 100 nm or more and/or a non-fibrous conductive carbon as conductive materials.

PRIOR ART LIST

Patent Literatures

Patent Document 1: JP 4835881 B
Patent Document 2: JP H09-57084 A
Patent Document 3: JP 2000-26240 A
Patent Document 4: JP 2001-29776 A
Patent Document 5: JP 2003-10663 A
Patent Document 6: JP 5-132567 A
Patent Document 7: JP 2007-203235 A
Patent Document 8: JP H05-212317 A
Patent Document 9: JP H04-43712 A

SUMMARY OF THE INVENTION

Problems to be Resolved by the Invention

A fibrous carbon having comparatively large fiber diameter and comparatively short fiber length (FIG. 1) enables easy dispersion of each fiber by the addition to a matrix followed by kneading because of weak entanglement between fibers. However, it may be difficult to sufficiently construct a conductive network by connecting fibrous carbons to each other. On the other hand, a fibrous carbon having comparatively small fiber diameter and comparatively long fiber length (FIG. 2) enables formation of aggregate of several hundred μm by entanglement between fibers (FIG. 3). Even if the fibrous carbon having an aggregation structure entangled firmly is added to a matrix, followed by kneading, the aggregate merely becomes thin and thus it is difficult to achieve a state where each fibrous carbon is dispersed while maintaining the aggregation structure. As a result, conductivity-imparting effect as expected may not be exerted.

An object of the present invention is to provide a method for producing composite carbon fibers in which two or more carbon fibers each having a different average fiber diameter are dispersed in a nearly homogenous state, the composite carbon fibers being excellent in the effect capable of being easily dispersed in a matrix such as a resin without leaving aggregate, and imparting low resistance.

Means for Solving the Problems

The present inventors have intensively studied so as to achieve the above-mentioned object, and thus completing the present invention including the following aspects.

That is, the present invention includes the following aspects.

[1] A method for producing composite carbon fibers, which comprises imparting a cavitation effect to slurry containing 6% by mass or less of two or more carbon fibers each having a different average fiber diameter under a pressure of 100 MPa or more and less than 245 MPa thereby to form a composite.

[2] The method according to [1], in which two or more carbon fibers each having a different average fiber diameter comprise carbon nanotubes having an average fiber diameter of 5 nm or more and 30 nm or less, and carbon nanofibers having an average fiber diameter of 50 nm or more and 300 nm or less.

[3] The method according to [1] or [2], which further comprises imparting high-pressure shear to the slurry.

[4] The method according to [3], in which the method of imparting a cavitation effect and high-pressure shear to the slurry comprises a method of passing slurry through a nozzle under a high pressure.

[5] The method according to [4], in which the nozzle comprises a linear passage.

[6] The method according to [4] or [5], in which the number of the operation of passing the slurry through a nozzle is once or more and five times or less.

Advantageous Effects of the Invention

It is possible to obtain composite carbon fibers in which two or more carbon fibers each having a different average fiber diameter are dispersed in a nearly homogenous state, by the method according to an embodiment of the present invention. The composite carbon fibers obtained by the method are excellent in the effect capable of easily being dispersed in a matrix such as a resin without leaving aggregate, and imparting low resistance. When electrodes of a lithium secondary battery are allowed to contain, as a conductivity-imparting agent, the composite carbon fibers, battery characteristics such as a capacity retention ratio are improved.

EMBODIMENTS FOR CARRYING OUT THE INVENTION

Figure 1:
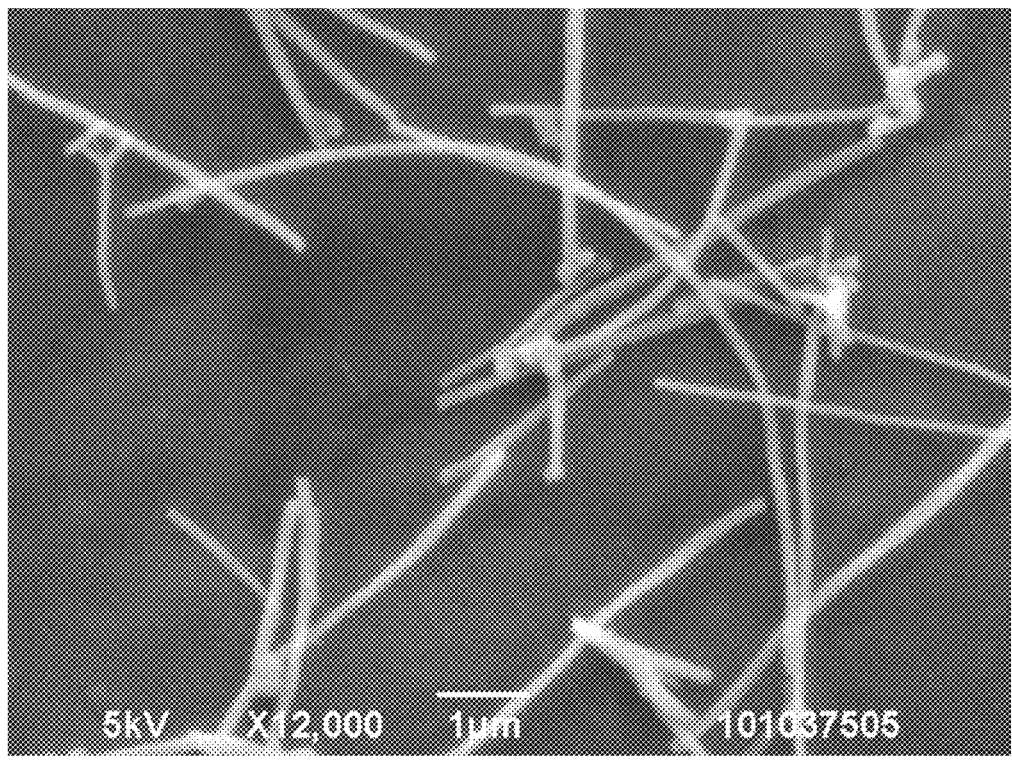
[FIG. 1] a diagram showing an example of a scanning electron micrograph of graphitized carbon nanofibers (12 k times).

The method according to an embodiment of the present invention comprises imparting a cavitation effect to slurry containing two or more carbon fibers each having a different average fiber diameter thereby to form a composite. The average fiber diameter of carbon fibers is obtained by averaging fiber diameters of fibers observed in ten or more visual fields using an electron microscope. Different average fiber diameter means that both average fiber diameters differ by 50 nm or more.

In the present invention, two or more carbon fibers each having the different average fiber diameter preferably comprises carbon nanotubes having an average fiber diameter of 5 nm or more and 30 nm or less, and carbon nanofibers having an average fiber diameter of 50 nm or more and 300 nm or less. As used herein, "fiber diameter of 5 nm or more and 30 nm or less" means that 99 number % or more of fibers have a fiber diameter within a range of 5 nm or more and 30 nm or less, while "fiber diameter of 50 nm or more and 300 nm or less" means that 99 number % or more of fibers have a fiber diameter within a range of 50 nm or more and 300 nm or less.

In the present invention, the amount of the carbon fiber having comparatively small average fiber diameter is preferably 1 part by mass or more and 100 parts by mass or less, more preferably 5 parts by mass or more and 90 parts by mass or less, and still more preferably 10 parts by mass or more and 80 parts by mass or less, based on 100 parts by mass of the carbon fiber having comparatively large average fiber diameter.

The carbon nanotubes used in the present invention are not particularly limited by the synthesis method and is preferably carbon nanotubes synthesized by a vapor phase method, and more preferably carbon nanotubes synthesized by a supported catalyst method.

The supported catalyst method is a method in which carbon nanotubes are produced by reacting a carbon source in a vapor phase, using a catalyst comprising a catalyst metal supported on an inorganic carrier.

Examples of the inorganic carrier include alumina, magnesia, silica-titania, calcium carbonate and the like. The inorganic carrier is preferably in a particulate form. Examples of the catalyst metal include iron, cobalt, nickel, molybdenum, vanadium and the like. Supporting can be carried out by impregnating a carrier with a solution of a compound containing a catalyst metal element, or by coprecipitating a solution of a compound containing a catalyst metal element and a compound containing elements composing an inorganic carrier, or by other known supporting methods.

Examples of the carbon source include methane, ethylene, acetylene and the like. The reaction can be carried out in a reaction vessel such as a fluidized bed, a moving bed or a fixed bed. The temperature in a reaction vessel is preferably set in a range from 500° C. to 800° C. To supply the carbon source to the reaction vessel, a carrier gas can be used. Examples of the carrier gas include hydrogen, nitrogen, argon and the like. The reaction time is preferably from 5 to 120 minutes.

The carbon nanotubes comprise a tubular structure in which a graphene sheet made of a six-membered carbon ring is wound in parallel to a fiber axis; a platelet structure in which a graphene sheet is arranged perpendicularly to a fiber axis; and a herringbone structure in which a graphene sheet is wound at a slanting angle to a fiber axis. Of these structures, the tubular structure is preferred in view of conductivity and mechanical strength.

The fiber diameter of the carbon nanotubes is preferably 5 nm or more and 30 nm or less, more preferably 7 nm or more and 20 nm or less, and still more preferably 9 nm or more and 15 nm or less. The fiber diameter of less than 5 nm may cause difficulty in disenentangling and dispersing each fiber. The fiber having a fiber diameter of more than 30 nm is difficult to produce by a supported catalyst method.

An aspect ratio of the carbon nanotubes is preferably 100 or more and 1,000 or less. Small aspect ratio may decrease the degree of entanglement between fibers and thus cause difficulty in forming an efficient conductive network. A Large aspect ratio may increase the degree of entanglement between fibers and thus cause difficulty in dispersing the fiber.

A BET specific surface area of the carbon nanotubes is preferably 200 $m^2/g$ or more and 300 $m^2/g$ or less, more preferably 240 $m^2/g$ or more and 280 $m^2/g$ or less, and still more preferably 250 $m^2/g$ or more and 270 $m^2/g$ or less.

A Co value of the carbon nanotubes is preferably 0.680 nm or more and 0.690 nm or less. The carbon nanotubes having a $C_0$ value of less than 0.680 nm may cause difficulty in disentangling aggregate because the fiber loses flexibility.

An oxidation initiation temperature of the carbon nanotubes is preferably 400° C. or higher and 550° C. or lower. The oxidation initiation temperature is defined as a temperature at which the weight decreases by 0.1% relative to initial weight (charge amount) when the temperature is raised to 1,000° C. at 10° C./minute under air flow in thermobalance. As the oxidation initiation temperature becomes lower, defects in the carbon crystal may increase.

Compressed specific resistance at the compressed density 0.8 $g/cm^3$ of carbon nanotubes is preferably 0.014 $\Omega cm$ or more and 0.020 $\Omega cm$ or less. The carbon nanotubes having small compressed specific resistance may cause loss of flexibility of the fiber. Large compressed specific resistance may cause exertion of low conductivity-imparting effect.

The carbon nanofibers used in the present invention are not particularly limited by the synthesis method and are preferably carbon nanofibers synthesized by a vapor phase method, and more preferably carbon nanofibers obtained by synthesizing by a floating catalyst method, followed by heat treatment in an inert atmosphere at 2,000° C. or higher.

The floating catalyst method is a method in which a raw material liquid prepared by dissolving ferrocene as a catalyst source and a sulfur compound in benzene as a carbon source, or a gas prepared by gasification of the raw material liquid is introduced into a flow reaction furnace heated at 1,000° C. or higher using a carrier gas such as hydrogen to obtain carbon fibers. Commonly, a hollow tube is formed from a catalyst metal as the starting point at an initial stage of a reaction and an approximate length of the carbon fibers is decided. Thereafter, pyrolytic carbon is accumulated on a surface of the hollow tube and growth in the diameter direction proceeds to form a growth ring-shaped carbon structure. Therefore, it is possible to adjust the fiber diameter by the amount of pyrolytic carbon accumulated on the carbon fibers during the reaction, that is, the reaction time, the concentration of the raw material in the atmosphere, and the reaction temperature. The carbon nanofibers obtained by this reaction may have low conductivity since it is coated with pyrolytic carbon having low crystallinity. Thus, in order to enhance crystallinity of the carbon fibers, heat treatment is carried out in the atmosphere of an inert gas such as argon at 800 to 1,500° C., followed by graphitization treatment at 2,000 to 3,000° C. The graphitization treatment enables removal of the catalyst metal through vaporization simultaneously, leading to high purity of the carbon nanofibers.

With regard to the carbon nanofibers obtained by the heat treatment, it is possible to adjust the length of the fiber or to break a branch of branched carbon fibers by a pluverizer. The graphitized carbon nanofibers whose branches were broken by the pulverizer can be easily compressed and dispersed because of lowered interference between fibers.

The fiber diameter of the carbon nanofibers is usually 50 nm or more and 300 nm or less, preferably 75 nm or more and 250 nm or less, and more preferably 100 nm or more and 200 nm or less. Large fiber diameter may cause a decrease in aspect ratio of the fiber because of the fiber growth mechanism. The aspect ratio decreases due to a large fiber diameter may cause a decrease in number of fibers per unit weight, leading to difficulty in efficiently forming a network in the matrix such as a resin. On the other hand, the aspect ratio increases due to a small fiber diameter may cause aggregation with ease, leading to difficulty in dispersing in the matrix such as a resin.

A BET specific surface area of the carbon nanofibers is preferably 6 $m^2/g$ or more and 40 $m^2/g$ or less, more preferably 8 $m^2/g$ or more and 25 $m^2/g$ or less, and still more preferably 10 $m^2/g$ or more and 20 $m^2/g$ or less.

A $C_0$ value of the carbon nanofibers is preferably 0.676 nm or more and 0.680 nm or less. The carbon nanofibers having a $C_0$ value of more than 0.680 nm may cause deterioration of conductivity.

An oxidation initiation temperature of the carbon nanofibers is preferably 600° C. or higher and 700° C. or lower. The graphite crystal may fail to sufficiently grow at the oxidation initiation temperature of lower than 600° C.

Compressed specific resistance at the compressed density of 0.8 $g/cm^3$ of the carbon nanofibers is preferably 0.006 $\Omega cm$ or more and 0.017 $\Omega cm$ or less. It is difficult to adjust compressed specific resistance of the graphitized carbon nanofibers to less than 0.006 $\Omega cm$. On the other hand, compressed specific resistance of more than 0.017 $\Omega cm$ may exert low conductivity-imparting effect.

The slurry can be obtained by adding two or more carbon fibers each having a different average fiber diameter to a solvent, followed by mixing. Examples of the solvent used are preferably water, and various organic solvents, for example, methanol, ethanol, isopropanol, hexane, acetone, N-methyl-2-pyrrolidone and the like. These solvents can be used alone, or two or more kinds of them can be used in combination. Of these solvents, water is preferred in view of environmental burden or ease of handling.

Figure 5:
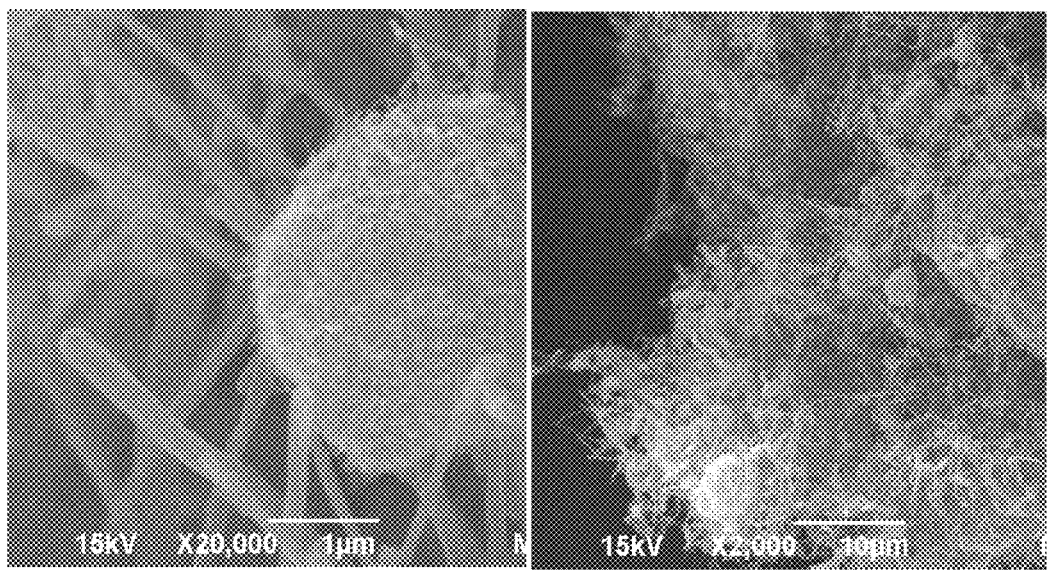
[FIG. 5] a diagram showing an example of a scanning electron micrograph of mixed carbon fibers aggregate (20 k times at the left, 2 k times at the right).

Commonly, since the carbon nanotubes are extremely likely to be aggregated, even if the carbon nanofibers are mixed with the carbon nanotubes, carbon nanotubes aggregate having an aggregate size of 1 μm or more and carbon nanofibers independently exist (see FIG. 5). Therefore, in the present invention, a cavitation effect is imparted to slurry.

Cavitation is a phenomenon in which, when the pressure becomes lower than a saturated vapor pressure for only a short time in liquid flow, numerous air bubbles are formed by separation of a boiled or dissolved gas of a liquid, from air bubble micronucleus existing in the liquid as a nucleus. After generation of cavitation, if ambient pressure becomes higher than a saturated vapor pressure, surrounding liquid concentrates toward the center of air bubbles, and thus strong pressure wave is generated by collision at the center at the moment when air bubbles disappear.

It is considered that, if cavitation is generated in slurry containing two or more carbon fibers each having a different average fiber diameter, rapid expansion due to formation of air bubbles and generation of pressure wave due to disappearance of air bubbles may occur in aggregate of the carbon fibers and the like, thereby, the aggregate of the carbon fibers undergoes disentanglement and the carbon fibers are dispersed, leading to formation of a composite of two or more carbon fibers each having a different average fiber diameter. Formation of a composite enables extension of a comparatively thick carbon fiber into the space between a comparatively thin carbon fiber disentangled in a loose state, leading to a state where the disentangled comparatively thin carbon fiber is entangled with a surface of the comparatively thick carbon fiber (see, for example, FIG. 4). When ten visual fields (area of one visual field: 70 μm×70 μm) of the composite carbon fibers are observed at random by a scanning electron microscope at a magnification of 2 k times, the number of visual field containing aggregate having an aggregate size of 1 μm or more becomes one or less. The dispersion state in the composite carbon fibers obtained by the method according to an embodiment of the present invention is completely different from the state shown in FIG. 5, and is an extremely specific state.

The solid content (concentrations of the multiwalled carbon nanotubes and the graphitized carbon nanofibers) of the slurry is preferably 6% by mass or less, and more preferably 1% by mass or more and 6% by mass or less. Too high solid content may cause an increase in viscosity of the slurry, leading to difficulty in proceeding of efficient disentanglement of the aggregate. A dispersing agent can be added to the slurry. However, it is preferred that the dispersing agent is not used since it is difficult to completely remove the dispersing agent from the obtained composite carbon fibers.

In the case of imparting the cavitation effect, the pressure is preferably 100 MPa or more and less than 245 MPa, and more preferably 100 MPa or more and less than 200 MPa. Imparting of the cavitation effect under high pressure may cause an increase in viscosity of the slurry. Before imparting of the cavitation effect, if the slurry is left to keep for one day, solid-liquid separation may occur. However, solid-liquid separation does not occur even if the slurry is left to keep for one day after imparting the cavitation effect under high pressure. This suggests that the carbon fibers formed a network structure.

Examples of the method of imparting the cavitation effect include a method by irradiation with ultrasonic wave under high pressure, a method in which slurry is injected into a nozzle by a high pressure thereby to pass it through the nozzle, a method by liquid injection of slurry under an ultrahigh pressure and the like. Of these methods, the method in which slurry is injected into a nozzle by a high pressure force thereby to pass it through the nozzle, or the method by liquid injection of slurry under an ultrahigh pressure is preferred since it is possible to impart the cavitation effect and strong shear force to slurry containing two or more carbon fibers each having a different average fiber diameter, at high density.

The nozzle used in the method in which slurry is injected into a nozzle by a high pressure thereby to pass it through the nozzle includes a cross type nozzle (see Patent Documents 2 to 6), a straight type nozzle and the like. In the present invention, a straight type nozzle is preferred. The straight type nozzle is a nozzle comprising a linear passage. In the nozzle, a slit, a through hole, a cross passage, a bent passage, a branch passage and the like are provided. When the slurry passes through the nozzle, collision against a wall, collision between slurrys, generation of turbulence, compression of liquid, expansion and shear occurs, in addition to cavitation. In the case of allowing the slurry to pass through a nozzle, the pressure is preferably 100 MPa or more and less than 245 MPa, and more preferably 100 MPa or more and less than 200 MPa. The slurry passed through the nozzle can be allowed to pass through the nozzle again. The number of the operation of passing the slurry through a nozzle is preferably once or more and five times or less, and more preferably once or more and three times or less. The number of the operation of passing the slurry through a nozzle of more than five times may cause formation of short carbon fiber and reaggregation.

In the method by liquid injection of slurry under an ultra-high pressure, a jet nozzle is used (see, for example, Patent Documents 7 to 9). In case where the slurry is injected into the liquid by a jet nozzle, cavitation is generated around the jet injection area. In the case of injecting the slurry, the pressure is preferably 100 MPa or more and less than 245 MPa, and more preferably 100 MPa or more and less than 200 MPa. The slurry subjected to liquid injection can be subjected to liquid injection again. The number of repetitions of liquid injection is preferably once or more and five times or less, and more preferably once or more and three times or less. The number of repetitions of more than five times may cause formation of short carbon fiber and reaggregation.

Then, the obtained slurry is powdered by drying. Examples of the drying method include spray drying, freeze-drying, drum drying, flush drying, hot-air drying and vacuum drying methods. The drying temperature is appropriately set by type of a dryer. Drying is preferably carried out until the moisture content as measured by a Karl-Fischer method becomes 0.5% by mass or less. After drying, pulverization is preferably carried out, if necessary. The pulverizing method is preferably a pulverizer using impact force by a hammer, a jet mill using collision of substances each other.

Size of the thus obtained composite carbon fibers aggregate is preferably 5 μm or more and 20 μm or less in terms of 50% particle diameter $D_{50}$ in volume-base particle size distribution measured by a particle size distribution analyzer using a laser diffraction and scattering method.

In the composite carbon fibers obtained by the method according to an embodiment of the present invention, a ratio $(\rho/\rho_0)$ of a density $\rho$ of composite carbon fibers when compressed under a load of 1,000 N or more to a density $\rho_0$ of graphitized carbon nanofibers when compressed under the same load is preferably 0.95 or more. The graphitized carbon nanofibers per se have a small aspect ratio and exerts low interaction between fibers, and thus easily undergoes compressive deformation under load. On the other hand, the multiwalled carbon nanotubes have a high aspect ratio and thus forms micron-order aggregate. Since the aggregate rebounds like a rubber ball, the density does not reach the same density as that of the graphitized carbon nanofibers unless a large load is applied.

A load-compressed density curve of aggregate-free composite carbon fibers composed of multiwalled carbon nanotubes is nearly the same as a load-compressed density curve of graphitized carbon nanofibers alone. That is, a ratio $(\rho/\rho_0)$ of a density $\rho$ of composite carbon fibers when compressed under a load of 1,000 N or more to a density $\rho_0$ of graphitized carbon nanofibers when compressed under the same load is 0.95 or more.

A load-compressed density curve of composite carbon fibers comprising multiwalled carbon nanotubes aggregate existing therein deviates from a load-compressed density curve of graphitized carbon nanofibers alone. That is, a ratio $(\rho/\rho_0)$ of a density $\rho$ of composite carbon fibers when compressed under a load of 1,000 N or more to a density $\rho_0$ of graphitized carbon nanofibers when compressed under the same load is less than 0.95.

In case an existing ratio of the multiwalled carbon nanotubes in the powder is less than 5% by mass, it is impossible to judge the presence or absence of aggregate only by this method. Therefore, it is necessary to evaluate, together with scanning electron microscopic observation of the powder.

In the composite carbon fibers obtained by the method according to an embodiment of the present invention, compressed specific resistance at the compressed density 0.8 g/cm$^3$ is preferably 0.005 Ωcm or more and 0.015 Ωcm or less. The compressed specific resistance at the compressed density of 0.8 g/cm$^3$ of the composite carbon fibers obtained by the method according to an embodiment of the present invention is preferably lower than a compressed specific resistance at the compressed density of 0.8 g/cm$^3$ measured using each carbon fiber alone before formation of a composite.

The composite carbon fibers obtained by the method according to an embodiment of the present invention can be suited for use in a cathode and/or an anode of a battery since it functions as a conductivity-imparting agent. For example, the cathode of the battery is composed of a cathode active material, a conductivity-imparting agent and a binder. For example, the anode of the battery is composed of an anode active material, a conductivity-imparting agent and a binder.

It is possible that one, or two or more cathode active materials can be appropriately selected from among conventionally known materials (materials capable of intercalating/deintercalating lithium ions) known as a cathode active material in a lithium-based battery, and used as the cathode active material. Of these materials, a lithium-containing metal oxide capable of intercalating/deintercalating lithium ions is preferred. Examples of the lithium-containing metal oxide include complex oxides containing a lithium element, and at least one element selected from Co, Mg, Cr, Mn, Ni, Fe, Al, Mo, V, W and Ti.

It is possible that one, or two or more anode active materials can be appropriately selected from among conventionally known materials (materials capable of intercalating/deintercalating lithium ions) known as an anode active material in a lithium-based battery, and used as the anode active material. Examples of the material capable of intercalating/deintercalating lithium ions include carbon material, any one of Si and Sn, or an alloy or oxide containing at least one of them and the like. Of these materials, a carbon material is preferable. Typical examples of the carbon material include artificial graphites produced by heat treatment of natural graphite, and petroleum- and coal-based coke; hard carbon produced by carbonizing a resin, and mesophase pitch-based carbon material. It is possible to use, as the anode active material, each of Si and Sn alone, an alloy containing at least one of Si and Sn, and oxides thereof, in addition to the carbon material.

It is possible to use, as the conductivity-imparting agent, for example, carbon black-based conductive materials such as acetylene black, furnace black and Ketjen black in combination, in addition to the composite carbon fibers according to the present invention. It is also possible that the carbon black-based conductive material is dry-blended with the composite carbon fibers, and the obtained mixture is added in the preparation of an electrode slurry. A mixing ratio of the composite carbon fibers to the carbon black-based conductive material is preferably from 10:90 to 70:30, and more preferably from 20:80 to 50:50. Dry blending may enable uniform mixing in a dry state using a nautamixer or a planetary mixer, and there is no particular limitation on the mixer or mixing conditions.

The binder can be appropriately selected from conventionally known materials and then used as the binder of the electrode for a lithium-based battery. Examples of the binder include fluorine-containing macromolecular polymers such as polyvinylidene fluoride, vinylidene fluoride-hexafluoropropylene copolymer, vinylidene fluoride-chlorotrifluoroethylene copolymer and vinylidene fluoride-tetrafluoroethylene copolymer, styrene-butadiene copolymer rubber (SBR) and the like.

EXAMPLES

Examples of the present invention will be shown and will be more specifically described below for illustrative purposes only, and the present invention is not limited thereto.

Properties of carbon fibers were measured by the following procedure.

(Fiber Diameter of Carbon Nanofibers)

Using a scanning electron microscope, diameters of 100 or more fibers were measured by a magnification of 20 k times and an average of the diameters was adopted as a fiber diameter.

(Fiber Length of Carbon Nanofibers)

Using a scanning electron microscope, photographs of the fibers were panoramatically taken at a magnification of 10 k or more times to prepare the visual field which enables the measurement of both ends of the fiber. The lengths of 100 or more fibers were measured and the average thereof was adopted as a fiber length.

(Fiber Diameter of Multiwalled Carbon Nanotubes)

Using a transmission electron microscope, diameters of 100 or more fibers were measured by a magnification of 100 k times and an average of the diameters was adopted as a fiber diameter.

(Fiber Length of Multiwalled Carbon Nanotubes)

Using a transmission electron microscope, photographs of the fibers were panoramatically taken at a magnification of 100 k or more times to prepare the visual field which enables the measurement of both ends of the fiber. The lengths of 50 or more fibers were measured and the average thereof was adopted as a fiber length.

(Specific Surface Area)

Using NOVA 1000 manufactured by Yuasa Ionics Co., Ltd., the amount of nitrogen gas adsorbed at a liquid nitrogen temperature (77 K) was calculated by a BET method.

(Measurement of $C_O$)

Using a Multipurpose X-ray diffraction system (Ultima IV manufactured by Rigaku Corporation), the measurement was carried out by using a silicone powder as an internal standard in accordance with a Gakushin-ho method ("Latest Experimental Technique for Carbon Materials (Analysis Part)", Edited by Carbon Society of Japan).

(Thermal Analysis)

In thermal analysis, EXSTAR6000 TG/DTA manufactured by SII NanoTechnology Inc. was used. A sample (10 mg) was placed on a platinum pan and then heated to 1,000° C. at a heating rate of 10° C./minute under thermal analysis measurement conditions of air flowing at a rate of 100 ml/minute.

(Concentration of Metal in Multiwalled Carbon Nanotubes and Carbon Nanofibers)

After collecting 20 to 40 mg of a sample in a beaker made of Teflon, 2 ml of sulfuric acid was added and a watch glass made of Teflon was put on the beaker, and then the beaker was placed on a ceramic heater set to 300° C., followed by heating for 30 minutes and allowing to cool for about 5 minutes. Then, 0.5 ml of nitric acid was added thereto, followed by heating. Until it became impossible to visually observe the contents, the addition of the nitric acid was repeated. After cooling to room temperature, about 20 ml of pure water and 0.5 ml of 50% hydrofluoric acid was added, followed by heating at 60 to 70° C. on a hot plate for 2 hours. Contents of the beaker were transferred to a vessel made of polypropylene and made to a constant volume of 50 ml, and then iron and molybdenum were quantitatively determined by an ICP emission spectrometer (Vista-PRO manufactured by SII NanoTechnology Inc.).

(Compressed Specific Resistance, Load-Compressed Density Curve)

Figure 7:
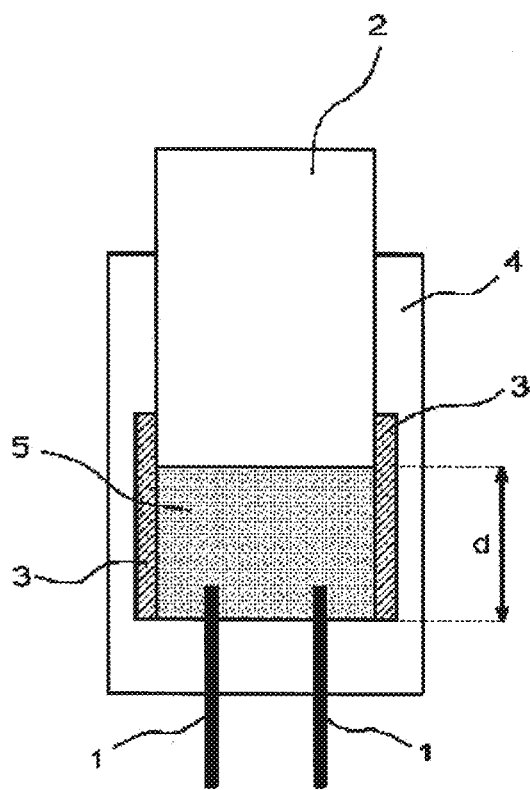
[FIG. 7] a diagram showing a vertical section of a cell for measurement of powder resistivity.

A measurement jig shown in FIG. 7 was used. A cell 4 is made of a resin measuring a plane area of (1×4) cm² and a depth of 10 cm, and is provided with a current terminal 3 made of a copper plate for allowing a current to flow to the object to be measured 5, and a terminal 1 in the middle for measurement of a voltage. A given amount of a sample is placed in the cell 4 and the sample is compressed by applying a force to a compression rod 2 from the above. A current of 0.1 A was allowed to flow to the sample and, at the time of a bulk density of 0.8 g/cm³, a voltage at a distance of 2.0 cm between two terminals 1 for measurement of a voltage inserted from the bottom of a vessel was read, and then resistivity R was calculated by the following equation:

$$R=(E/0.1)\times D/2$$

where R denotes a resistivity [Ωcm], D denotes a cross-sectional area in the current direction of a powder (depth× width)=10 d [cm²], and E denotes a voltage across terminal [V].

The resistivity varies depending on the pressurized conditions and high resistivity is exhibited under low pressure, and the resistivity decreases as the pressure increases. The resistivity becomes nearly a given value under certain pressure or higher. In the present Example, resistivity when compressed to a bulk density of 0.8 g/cm³ was adopted as a compressed specific resistance.

At the time of measurement of the compressed specific resistance, data of a compressed density ρ under the load of 2,000 N was read and a ratio (ρ/ρ₀) of the compressed density ρ to a compressed density ρ₀ under the same load of carbon nanofibers composing the carbon fibers alone was calculated.

Production Example 1

Preparation of Catalyst

Aluminum hydroxide (HIGILITE M-43 manufactured by Showa Denko K.K.) was subjected to heat treatment in the atmosphere where air flows at 850° C. for 2 hours to prepare a carrier.

In a 300 ml tall beaker, 50 g of pure water was charged, and then 4.0 g of the carrier was added and dispersed to prepare a carrier slurry.

In a 50 ml beaker, 16.6 g of pure water was charged, and then 0.32 g of hexammonium heptamolybdate tetrahydrate (manufactured by Junsei Chemical Co., Ltd.) was added and dispersed. Thereafter, 7.23 g of iron(III) nitrate nonahydrate (manufactured by Kanto Chemical Co., Inc.) was added and dispersed to prepare a catalyst solution.

In another 50 ml beaker, 32.7 g of pure water was charged, and then 8.2 g of ammonium carbonate (manufactured by Kanto Chemical Co., Inc.) was added and dispersed to prepare a pH control liquid.

A stirring bar was placed in a tall beaker containing a carrier slurry, and then the beaker was placed on a magnetic stirrer, followed by stirring. While monitoring using a pH meter so as to maintain the pH of the slurry at 6.0±0.1, the catalyst solution and the pH control liquid were respectively added dropwise in the carrier slurry using a Pasteur pipette. Fifteen minutes were required to add the total amount of the catalyst solution to the carrier slurry. Contents of tall beaker were separated by a filter paper (5C) and the cake on the filter paper was washed by spraying 50 g of pure water. The thus washed filter cake was transferred to a porcelain dish and then dried for 6 hours by a hot-air dryer at 120° C. The obtained dry matter was pulverized by a mortar to obtain a catalyst for synthesis of multiwalled carbon nanotubes.

Production Example 2

Synthesis of Multiwalled Carbon Nanotubes: MWCNT

The catalyst (1.0 g) obtained in Production Example 1 was placed on a quartz boat. The quartz boat was placed at the center in a horizontal tubular furnace (quartz tube: inner diameter of 50 mm, length of 1,500 mm, soaking area of 600 mm). While allowing a nitrogen gas to flow through the horizontal tubular furnace at 500 ml/minute, a temperature was raised to 680° C. over 30 minutes. Thereafter, supply of the nitrogen gas was stopped and a mixed gas of ethylene with hydrogen (ethylene concentration of 50% by volume) was allowed to flow at 2,000 ml/minute, followed by reaction for 20 minutes to synthesize multiwalled carbon nanotubes. Supply of the mixed gas was stopped and the nitrogen gas was supplied. After cooling to room temperature, the multiwalled carbon nanotubes were taken out from the furnace.

Figure 2:
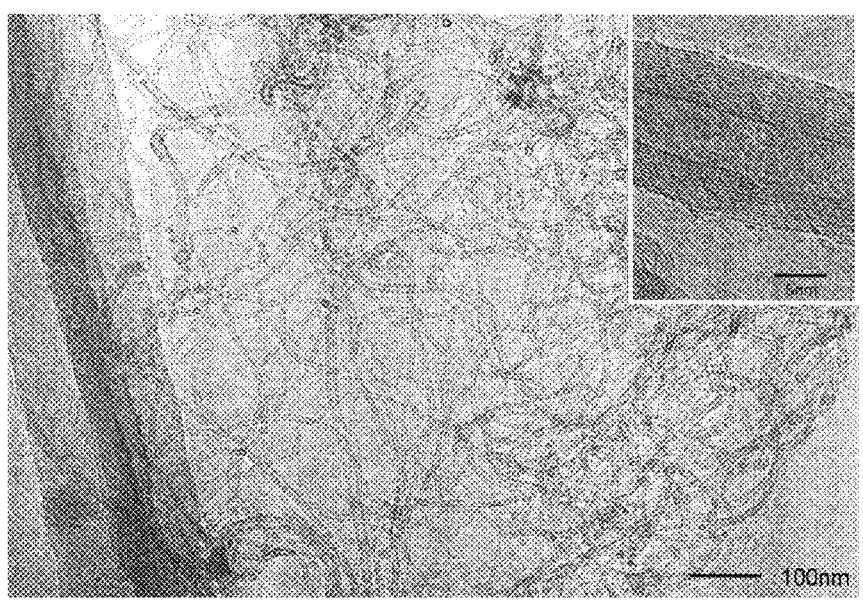
[FIG. 2] a diagram showing an example of a transmission electron micrograph of multiwalled carbon nanotubes (100 k times at the center of the micrograph, 500 k times at the upper right)

Fiber shape and powder properties are shown in Table 1. A transmission electron micrograph is shown in FIG. 2.

Production Example 3

Grinding of Multiwalled Carbon Nanotubes: Ground MWCNT Product

Using a jet mill STJ-200 manufactured by Seishin Enterprise Co., Ltd., the multiwalled carbon nanotubes synthesized in Production Example 2 were pulverized under the conditions of a pusher nozzle pressure of 0.64 MPa and a gliding nozzle pressure of 0.60 MPa. A 50% particle diameter D50 in volume-based cumulative particle size distribution of aggregate was 6 μm.

Figure 3:
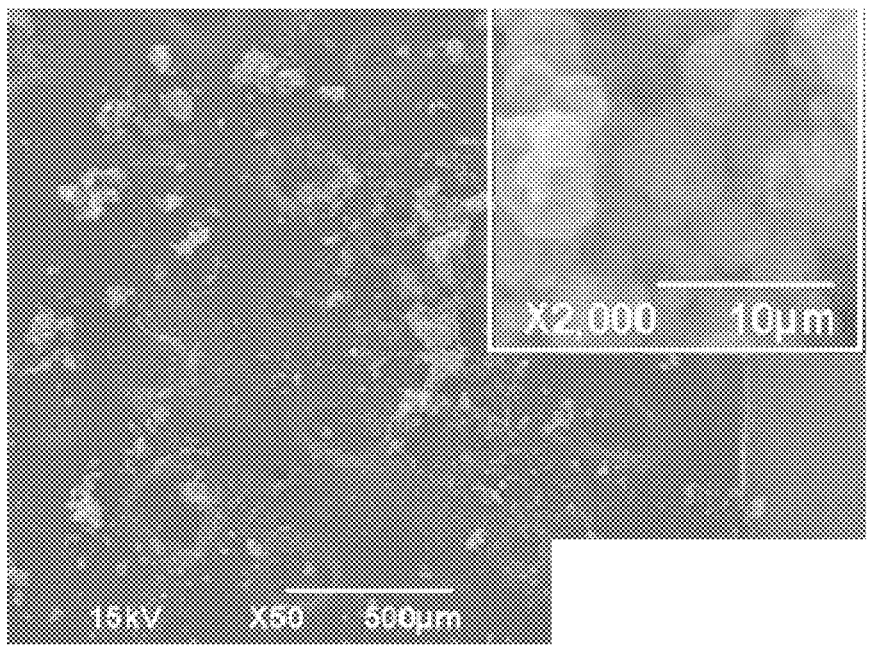
[FIG. 3] a diagram showing an example of a scanning electron micrograph of pulverized multiwalled carbon nanotubes aggregate immediately after synthesis (50 times at the center of the micrograph, 2 k times at the upper right).

Fiber shape and powder properties are shown in Table 1, and a scanning electron micrograph of the aggregate is shown in FIG. 3.

Production Example 4

Synthesis of Carbon Nanofibers

A reactor composed of a reaction tube measuring 370 mm in inner diameter and 2,000 mm in length, and a heater was prepared. A two fluid mixing nozzle for supplying a raw material was disposed at the upper portion of the reaction tube and a conveyor was disposed at the lower portion of the reaction tube, and then they were connected to a tank provided with a bag filter. An inflammable gas passed through the bag filter was allowed to undergo combustion by an incinerator.

Ferrocene (0.49 kg) and sulfur (0.01 kg) were dissolved in benzene (13.5 kg) to prepare a raw material liquid (content of ferrocene: 3.5% by mass, the content of sulfur: 0.08% by mass in the raw material liquid).

The thus prepared raw material liquid was supplied at 360 g/minute and hydrogen was supplied at 700 NL/minute, and then the raw material liquid was sprayed into the reaction tube through two fluid nozzles and passed through a reaction furnace heated at 1,300° C. to synthesize carbon fibers. After supplying the raw material for 2 hours, supply of the raw material liquid and hydrogen was stopped, and then nitrogen was supplied to replace an inflammable gas.

Production Example 5

Calcination of Carbon Nanofibers: Calcined CNF

A graphite crucible (measuring an outer diameter of 100 mm, an inner diameter of 85 mm and a length of 200 mm) was filled with 80 g of the carbon nanofibers obtained in Production Example 4 and then set in a calcination furnace (inner diameter: 120 mm). Tar adhered to the carbon nanofibers was removed by raising the temperature to 1,200° C. over 4 hours in an argon atmosphere, followed by maintaining for 1 hour. After calcination, the calcined carbon nanofibers recovered from the graphite crucible were pulverized by a juicer mixer (Fiber Mixer MX-X57 manufactured by Panasonic Corporation) for 1 minute.

Fiber shape and powder properties are shown in Table 1.

Production Example 6

Graphitization of Carbon Nanofibers: Graphitized CNF

A graphite crucible was filled with the calcined carbon nanofibers obtained in Production Example 5 and then set in a high-frequency heating furnace (inner diameter: 120 mm). The carbon nanofibers were graphitized by raising the temperature to 2,800° C. over 4 hours in an argon atmosphere, followed by maintaining for 1 hour. After graphitization treatment, the graphitized carbon nanofibers recovered from the graphite crucible were pulverized at a rotational speed of 5,000 rpm using airflow pulverizer KV-3 Labo Unit manufactured by Yakushin Kikai Seisakusho.

Fiber shape and powder properties are shown in Table 1, and a scanning electron micrograph of the fibers is shown in FIG. 1.

TABLE 1

| | Production Example | | | |
| --- | --- | --- | --- | --- |
| | 2 MWCNT | 3 Pulverized MWCNT product | 5 Calcined CNF | 6 Graphitized CNF |
| Fiber Diameter (nm) | 10 | 10 | 180 | 180 |
| Fiber Length (μm) | 4.5 | 4.0 | 7.5 | 7.2 |
| Aspect ratio | 450 | 400 | 42 | 40 |

TABLE 1-continued

| | Production Example | | | |
|---|---|---|---|---|
| | 2 MWCNT | 3 Pulverized MWCNT product | 5 Calcined CNF | 6 Graphitized CNF |
| Compressed specific resistance ($\Omega$cm) | 0.0162 | 0.0178 | 0.0424 | 0.0151 |
| BET specific surface area (m$^2$/g) | 260 | 260 | 14 | 13 |
| $C_0$ (nm) | 0.683 | 0.683 | 0.693 | 0.677 |
| Oxidation initiation temp. (deg C.) | 460 | 460 | 510 | 660 |
| Inpurities | | | | |
| Fe (ppm) | 12000 | 12000 | 14000 | 10 |
| Mo (ppm) | 2000 | 2000 | N.D. | N.D. |

[Evaluation of Dispersion State]

A sample powder was allowed to adhere to a carbon tape and subjected to vapor deposition of gold to give an observation sample, which was then observed by a scanning electron microscope (JSM-6390 manufactured by JEOL Ltd.). One visual field measures 70 μm×70 μm.

(Evaluation Criteria of Dispersion State)

A: Number of visual fields in which aggregate of 1 μm or more in size exists is 1 or less of 10 (visual fields) (at magnification of 2 k times)
B: Number of visual fields in which aggregate of 1 μm or more in size exists is 2 to 4 of 10 (visual fields) (at magnification of 2 k times)
C: Number of visual fields in which aggregate of 1 μm or more in size exists is 5 or more of 10 (visual fields) (at magnification of 2 k times)

(Presence or Absence of Carbon Nanotubes Aggregate Having Aggregate Size of 1 μm or More)

Using a scanning electron microscope, ten visual fields were observed at a magnification of 2 k times. In the case where the number of visual fields comprising carbon nanotubes aggregate having an aggregate size of 1 μm or more is 1 or less of ten visual fields, it was expressed by "Not observed" as shown in Table 2 since it is recognized that "carbon nanotubes aggregate having an aggregate size of 1 μm or more is not substantially contained". In the case where the number of visual fields comprising carbon nanotubes aggregate having an aggregate size of 1 μm or more is 2 or more of ten visual fields, it was expressed by "Observed" as shown in Table 2 since it is recognized that "carbon nanotubes aggregate having an aggregate size of 1 μm or more is substantially contained". One visual field measures 70 μm×70 μm.

In case where a micron-order globular substance is recognized when observed at a magnification of 2 k times, the globular substance was observed again at a magnification of 10 k or more and it was reconfirmed whether or not it is aggregate of the multiwalled carbon nanotubes.

Example 1

In a 2 L beaker, 1,485 g of pure water and a stirring bar were placed, and the beaker was placed on a magnetic stirrer. After weighing 13.5 g of the graphitized carbon nanofibers obtained in Production Example 6 and 1.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

(Cavitation Distribution Treatment)

The slurry in the tank was transferred to a piping by a slurry supply pump, and then pressed into a single nozzle chamber (nozzle diameter 150 μm) under 150 MPa by a hydraulic cylinder pump. In the single nozzle chamber, cavitation and high-pressure shear were generated by jet injection into the liquid. The liquid subjected to cavitation dispersion treatment was passed through a heat exchanger and then recovered in a 2 L beaker. The slurry was passed through the single nozzle chamber once.

The liquid subjected to the cavitation dispersion treatment was filtered through a filter paper (5C) set in Nutsche under evacuation conditions by an aspirator. Filtration was completed at the time when a cake-shaped solid matter on the filter paper undergoes cracking and the pressure reaches around an atmospheric pressure (−150 mmHg) from an reduced state (−750 mmHg).

The obtained cake-shaped solid matter was placed in a porcelain dish and then dried for 9 hours using a hot air dryer set at 150° C.

Figure 4:
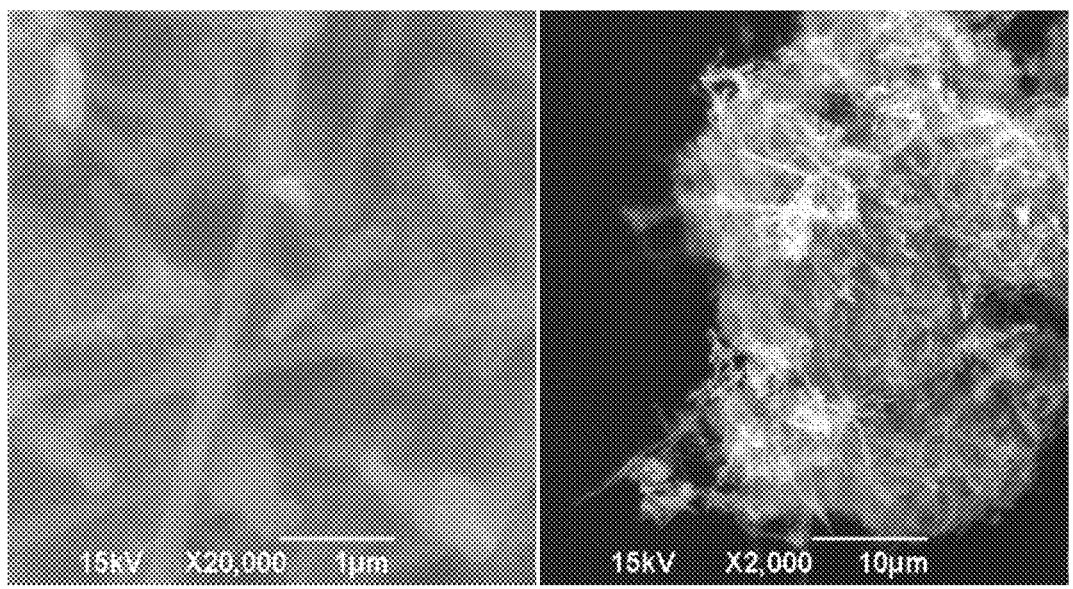
[FIG. 4] a diagram showing an example of a scanning electron micrograph of composite carbon fibers aggregate (20 k times at the left, 2 k times at the right).

The dry aggregated composite carbon fibers were pulverized by a juicer mixer for 1 minute to obtain composite carbon fibers. A scanning electron micrograph of the obtained composite carbon fibers is shown in FIG. 4, and presence or absence of aggregate of 1 μm or more in size and powder properties are shown in Table 2.

Example 2

In a 2 L beaker, 1,485 g of pure water and a stirring bar were placed, and the beaker was placed on a magnetic stirrer. After weighing 13.5 g of the graphitized carbon nanofibers obtained in Production Example 6 and 1.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, except that the slurry was passed through the single nozzle chamber three times, the slurry was subjected to cavitation dispersion treatment, followed by solid-liquid separation and further drying to obtain composite carbon fibers. Presence or absence of aggregate of 1 μm or more in size and powder properties are shown in Table 2.

Example 3

In a 2 L beaker, 1,485 g of pure water and a stirring bar were placed, and the beaker was placed on a magnetic stirrer. After weighing 13.5 g of the graphitized carbon nanofibers obtained in Production Example 6 and 1.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, except that the slurry was passed through the single nozzle chamber five times, the slurry was subjected to cavitation dispersion treatment, followed by solid-liquid separation and further drying to obtain composite carbon fibers. Presence or absence of aggregate of 1 μm or more in size and powder properties are shown in Table 2.

Example 4

In a 2 L beaker, 1,485 g of pure water and a stirring bar were placed, and the beaker was placed on a magnetic stirrer. After weighing 13.5 g of the graphitized carbon nanofibers obtained in Production Example 6 and 1.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, except that the slurry was pressed into the single nozzle chamber under a pressure of 100 MPa, the slurry was subjected to cavitation dispersion treatment, followed by solid-liquid separation and further drying to obtain composite carbon fibers. Presence or absence of aggregate of 1 μm or more in size and powder properties are shown in Table 2.

Example 5

In a 2 L beaker, 1,485 g of pure water and a stirring bar were placed, and the beaker was placed on a magnetic stirrer. After weighing 13.5 g of the graphitized carbon nanofibers obtained in Production Example 6 and 1.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, except that the slurry was injected into the single nozzle chamber under a pressure of 180 MPa, the slurry was subjected to cavitation dispersion treatment, followed by solid-liquid separation and further drying to obtain composite carbon fibers. Presence or absence of aggregate of 1 μm or more in size and powder properties are shown in Table 2.

Example 6

In a 2 L beaker, 1,485 g of pure water and a stirring bar were placed, and the beaker was placed on a magnetic stirrer. After weighing 40.5 g of the graphitized carbon nanofibers obtained in Production Example 6 and 4.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, the slurry was subjected to cavitation dispersion treatment, followed by solid-liquid separation and further drying to obtain composite carbon fibers. Presence or absence of aggregate of 1 μm or more in size and powder properties are shown in Table 2.

Example 7

In a 2 L beaker, 1,485 g of pure water and a stirring bar were placed, and the beaker was placed on a magnetic stirrer. After weighing 90 g of the graphitized carbon nanofibers obtained in Production Example 6 and 10 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, the slurry was subjected to cavitation dispersion treatment, followed by solid-liquid separation and further drying to obtain composite carbon fibers. Presence or absence of aggregate of 1 μm or more in size and powder properties are shown in Table 2.

TABLE 2

|  | Example | | | | | | |
| --- | --- | --- | --- | --- | --- | --- | --- |
|  | 1 | 2 | 3 | 4 | 5 | 6 | 7 |
| Mixing method | Cavitation Dispersion treatment | Cavitation Dispersion treatment | Cavitation Dispersion treatment | Cavitation Dispersion treatment | Cavitation Dispersion treatment | Cavitation Dispersion treatment | Cavitation Dispersion treatment |
| Solid Component Concentration | 1 | 1 | 1 | 1 | 1 | 3 | 6 |
| Number of treatment | 1 | 3 | 5 | 1 | 1 | 1 | 1 |
| Pressure [MPa] | 150 | 150 | 150 | 100 | 180 | 150 | 150 |
| Dispersion state | A | A | A | A | A | A | A |
| Aggregate of 1 μm or more in size | not observed | not observed | not observed | not observed | not observed | not observed | not observed |

Comparative Example 1

In a 2 L beaker, 1,455 g of pure water and a stirring bar were placed, and the beaker was placed on a magnetic stirrer. After weighing 40.5 g of the graphitized carbon nanofibers obtained in Production Example 6 and 4.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

The slurry in the tank was transferred to a piping by a slurry supply pump, and then pressed into a single nozzle chamber (nozzle diameter 150 μm) under 50 MPa by a hydraulic cylinder pump. The liquid subjected to dispersion treatment using the single nozzle chamber was passed through a heat exchanger and then recovered in a 2 L beaker. The slurry was passed through the single nozzle chamber once.

Figure 6:
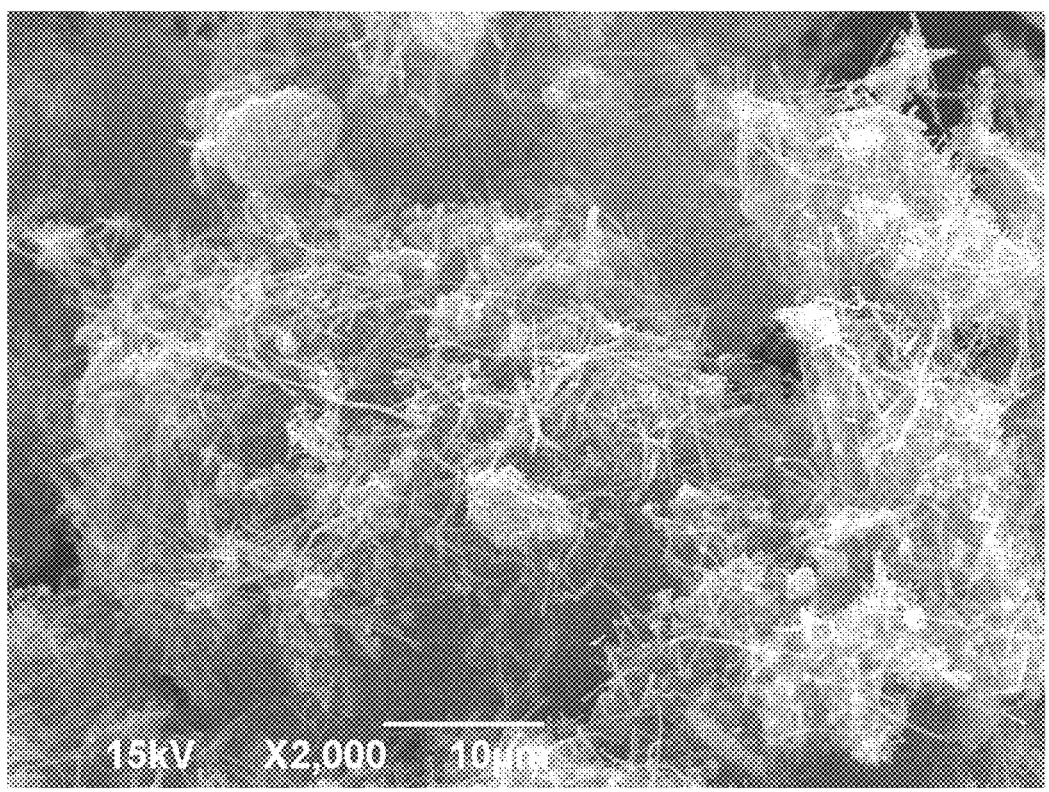
[FIG. 6] a diagram showing an example of a scanning electron micrograph of composite carbon fibers produced in Comparative Example 1 (2 k times)

In the same manner as in Example 1, the slurry was subjected to solid-liquid separation, and then dried to obtain composite carbon fibers. A scanning electron micrograph of the obtained composite carbon fibers is shown in FIG. 6. Presence or absence of aggregate of 1 μm or more in size and powder properties are shown in Table 3.

Comparative Example 2

In a 2 L beaker, 1,395 g of pure water and a stirring bar were placed, and the beaker was placed on a magnetic stirrer. After weighing 94.5 g of the graphitized carbon nanofibers obtained in Production Example 6 and 10.5 g of the pulverized multiwalled carbon nanotube product obtained in Production Example 3, they were put in pure water, followed by stirring for 5 minutes. Thereafter, the slurry was charged in a Star Burst tank manufactured by SUGINO MACHINE LIMITED.

In the same manner as in Example 1, the slurry was subjected to cavitation dispersion treatment and solid-liquid separation, and then dried to obtain composite carbon fibers. Presence or absence of aggregate of 1 μm or more in size and powder properties are shown in Table 3.

Comparative Example 3

After weighing 4.9 g of the graphitized carbon nanofibers obtained in Production Example 6 and 0.1 g of the pulverized multiwalled carbon nanotube product obtained in Production Example 3, they were mixed by a juicer mixer for one minute to obtain mixed carbon fibers. A scanning electron micrograph of the obtained mixed carbon fibers is shown in FIG. 5. Presence or absence of aggregate of 1 μm or more in size and powder properties are shown in Table 3.

Comparative Example 4

After weighing 4.9 g of the graphitized carbon nanofibers obtained in Production Example 6 and 0.1 g of the pulverized multiwalled carbon nanotube product obtained in Production Example 3, they were treated by a Dry star (beads diameter: 5 mm, circumferential speed: 10 m/second) manufactured by Ashizawa Finetech Ltd. for 5 minutes to obtain mixed carbon fibers. Presence or absence of aggregate of 1 μm or more in size and powder properties are shown in Table 3.

Comparative Example 5

Rotor-Stator Homogenizer

In a 300 mL beaker, 198 g of pure water and a stirring bar were placed, and the beaker was placed on a magnetic stirrer. After weighing 1.8 g of the graphitized carbon nanofibers obtained in Production Example 6 and 0.2 g of the pulverized multiwalled carbon nanotube product obtained in Production Example 3, they were put in pure water, followed by stirring for 5 minutes. Thereafter, the slurry was charged in an AGI HOMOMIXER manufactured by PRIMIX Corporation and then treated at 8,000 rpm for 5 minutes. Then, in the same manner as in Example 1, the slurry was subjected to solid-liquid separation, and then dried to obtain mixed carbon fibers. Presence or absence of aggregate of 1 μm or more in size and powder properties are shown in Table 3.

Comparative Example 6

Ultrasonic Homogenizer

In a 300 mL beaker, 198 g of pure water and a stirring bar were placed, and the beaker was placed on a magnetic stirrer. After weighing 1.8 g of the graphitized carbon nanofibers obtained in Production Example 6 and 0.2 g of the pulverized multiwalled carbon nanotube product obtained in Production Example 3, they were put in pure water, followed by stirring for 5 minutes. Thereafter, the slurry was treated by an ultrasonic homogenizer (frequency: 20 kHz) manufactured by Branson Corp. for one minute. Then, in the same manner as in Example 1, the slurry was subjected to solid-liquid separation, and then dried to obtain mixed carbon fibers. Presence or absence of aggregate of 1 μm or more in size and powder properties are shown in Table 3.

TABLE 3

| | Comp. Example | | | | | |
|---|---|---|---|---|---|---|
| | 1 | 2 | 3 | 4 | 5 | 6 |
| Mixing method | Cavitation Dispersion treatment | Cavitation Dispersion treatment | Juicer mixing | Beads milling | Rotor-stator homogenization | Ultrasonic homogenization |
| Solid Component Concentration | 3 | 7 | — | — | 1 | 1 |
| Number of treatment | 1 | 1 | 1 | 1 | 1 | 1 |
| Pressure [MPa] | 50 | 150 | — | — | — | — |
| Dispersion state | C | B | C | C | C | B |
| Aggregate of 1 μm or more in size | observed | observed | observed | observed | observed | observed |

A battery was evaluated by the following procedure.
(Production of Li Ion Battery Test Cell (Laminate Cell))

A laminate cell was produced in the following manner. The following operation was carried out in a dry argon atmosphere at a dew point of −80° C. or lower.

A cathode and an anode were disposed opposite to each other, comprising a separator (microporous film made of polypropylene (Celgard 2400 manufactured by Celgard Inc.), 25 μm) therebetween to produce a stuck. The obtained laminate was wrapped with an aluminum film, and then three sides were heat-sealed. Thereafter, an electrolytic solution was injected into the sealed laminate, followed by vacuum heat sealing to obtain a cell for test.
(Electrolytic Solution)

A solvent is mixture of 2 parts by volume of EC (ethylene carbonate) with 3 parts by volume of EMC (ethyl methyl carbonate) and an electrolyte is 1.0 mol/liter of LiPF6. An electrolytic solution also contains 1% by mass of VC (vinylene carbonate) as an additive.
(Large Current Loading Test (Laminated Cell))

First, constant current charging was carried out at a current corresponding to 0.2 C from a rest potential to 3.6 V, and then constant voltage charging was carried out at 3.6 V and charging was stopped at the time when the current value decreases to the value corresponding to 1/20 C.

Next, each constant current discharging was carried out at a current value corresponding to 0.2 C, 7.0 C and 10.0 C, followed by cutting-off at a voltage of 2.5 V.

A ratio of a discharge capacity at a current value corresponding to 7.0 C and a ratio of a discharge capacity at a current value corresponding to 10.0 C to a discharge capacity at a current value corresponding to 0.2 C were employed as a 7 C capacity ratio and a 10 C capacity ratio (discharge capacity retention ratio).

Example 8

The method for producing a cathode sample is shown below.

After weighing 200 g in total such that amass ratio of lithium iron phosphate having an average primary particle diameter of 200 nm and an average secondary particle diameter of 2 μm, the composite carbon fibers obtained in Example 1 and acetylene black becomes 94.7:2.1:3.2, dry mixed was performed using TK HIVIS MIX (Model 2P-03, manufactured by PRIMIX Corporation). To the obtained mixture, an N-methyl-2-pyrrolidone solution of polyvinylidene fluoride (KF-polymer (L#1320) manufactured by KUREHA CHEMICAL INDUSTRY CO., LTD.) was added such that the solid content of polyvinylidene fluoride becomes 5% by mass, and then the mixture was kneaded. While adding N-methyl-2-pyrrolidone, the kneaded mixture was further kneaded to obtain slurry having an optimum coating viscosity.

The slurry was applied on an aluminum foil using an automatic coating machine and dried at 100° C., followed by drying using a vacuum dryer (100° C.) Thereafter, the coated aluminum foil was punched into a predetermined size and pressed using a uniaxial press (at an electrode density of 2.0 g/cm$^3$).

Subsequently, the method for producing an anode sample is shown.

After weighing 200 g in total such that amass ratio of an anode active material (SCMG (registered trademark): manufactured by Showa Denko K.K., average particle diameter: 6 μm), acetylene black and fibrous carbon (VGCF-H: manufactured by Showa Denko K.K.) becomes 97.3:2.2:0.5, dry mixing was performed using TK HIVIS MIX. To the obtained mixture, an N-methyl-2-pyrrolidone solution of polyvinylidene fluoride (KF-polymer (L#9130) manufactured by KUREHA CHEMICAL INDUSTRY CO., LTD.) was added such that the solid content of polyvinylidene fluoride becomes 5% by mass, and then the mixture was kneaded. While adding N-methyl-2-pyrrolidone, the kneaded mixture was further kneaded to obtain slurry having an optimum coating viscosity.

The slurry was applied on a copper foil using an automatic coating machine and dried at 90° C., followed by drying using a vacuum dryer (90° C.). Thereafter, the coated copper foil was punched into a predetermined size and pressed using a uniaxial press (at an electrode density of 1.3 g/cm$^3$).

The evaluation results of the battery are shown in Table 4.

Example 9

In the same manner as in Example 8, except that the composite carbon fibers obtained in Example 1 were changed to the composite carbon fibers obtained in Example 2, a cathode sample was produced and a battery was evaluated. The evaluation results of the battery are shown in Table 4.

Example 10

In the same manner as in Example 8, except that the composite carbon fibers obtained in Example 1 were changed to the composite carbon fibers obtained in Example 3, a cathode sample was produced and a battery was evaluated. The evaluation results of the battery are shown in Table 4.

Example 11

In the same manner as in Example 8, except that the composite carbon fibers obtained in Example 1 were changed to the composite carbon fibers obtained in Example 4, a cathode sample was produced and a battery was evaluated. The evaluation results of the battery are shown in Table 4.

Example 12

In the same manner as in Example 8, except that the composite carbon fibers obtained in Example 1 were changed to the composite carbon fibers obtained in Example 5, a cathode sample was produced and a battery was evaluated. The evaluation results of the battery are shown in Table 4.

Example 13

In the same manner as in Example 8, except that the composite carbon fibers obtained in Example 1 were changed to the composite carbon fibers obtained in Example 6, a cathode sample was produced and a battery was evaluated. The evaluation results of the battery are shown in Table 4.

Example 14

In the same manner as in Example 8, except that the composite carbon fibers obtained in Example 1 were changed to the composite carbon fibers obtained in Example 7, a cathode sample was produced and a battery was evaluated. The evaluation results of the battery are shown in Table 4.

TABLE 4

| capacity retention ratio (%) to | Example | | | | | | |
|---|---|---|---|---|---|---|---|
| 0.2 C capacity | 8 | 9 | 10 | 11 | 12 | 13 | 14 |
| 7 C | 60 | 59 | 59 | 59 | 62 | 59 | 57 |
| 10 C | 40 | 39 | 38 | 39 | 41 | 38 | 38 |

Comparative Example 7

In the same manner as in Example 8, except that the composite carbon fibers obtained in Example 1 were changed to the mixed carbon fibers obtained in Comparative Example 1, a cathode sample was produced and a battery was evaluated. The evaluation results of the battery are shown in Table 5.

Comparative Example 8

In the same manner as in Example 8, except that the composite carbon fibers obtained in Example 1 were changed to the mixed carbon fibers obtained in Comparative Example 2, a cathode sample was produced and a battery was evaluated. The evaluation results of the battery are shown in Table 5.

Comparative Example 9

In the same manner as in Example 8, except that the composite carbon fibers obtained in Example 1 were changed to the mixed carbon fibers obtained in Comparative Example 3, a cathode sample was produced and a battery was evaluated. The evaluation results of the battery are shown in Table 5.

Comparative Example 10

In the same manner as in Example 8, except that the composite carbon fibers obtained in Example 1 were changed to the mixed carbon fibers obtained in Comparative Example 4, a cathode sample was produced and a battery was evaluated. The evaluation results of the battery are shown in Table 5.

Comparative Example 11

In the same manner as in Example 8, except that the composite carbon fibers obtained in Example 1 were changed to the mixed carbon fibers obtained in Comparative Example 5, a cathode sample was produced and a battery was evaluated. The evaluation results of the battery are shown in Table 5.

Comparative Example 12

In the same manner as in Example 8, except that the composite carbon fibers obtained in Example 1 were changed to the mixed carbon fibers obtained in Comparative Example 6, a cathode sample was produced and a battery was evaluated. The evaluation results of the battery are shown in Table 5.

TABLE 5

| capacity retention ratio (%) to | Comp. Example | | | | | |
| --- | --- | --- | --- | --- | --- | --- |
| 0.2 C capacity | 7 | 8 | 9 | 10 | 11 | 12 |
| 7 C | 51 | 46 | 50 | 51 | 45 | 52 |
| 10 C | 19 | 11 | 15 | 17 | 9 | 20 |

As shown in the table, it is possible to obtain specific properties, which cannot be obtained by other mixing methods, by adding composite carbon fibers obtained by the method of the present invention to electrodes. This is because reaggregation of the disentangled multiwalled carbon nanotubes is suppressed even during drying in the composite carbon fibers obtained by the method of the present invention, and thus multiwalled carbon nanotubes and carbon nanofibers are easily dispersed when electrode slurry is prepared.

On the other hand, in the mixed carbon fibers obtained by a conventional method, aggregate of 1 μm or more in size composed of the multiwalled carbon nanotubes contained therein is not completely disentangled by stirring when electrode slurry is prepared.

In Comparative Example 7, the multiwalled carbon nanotubes were not sufficiently dispersed because of low pressure when pressed into the nozzle, and thus formation of a composite with the graphitized carbon nanofibers is only partially achieved. In Comparative Example 8, since the solid concentration is high at the time of composite formation treatment, viscosity of the dispersion increases and the multiwalled carbon nanotubes were not sufficiently dispersed, resulting in aggregation of carbon nanotubes.

In Comparative Examples 9 and 10, since a treating method by dry mixing is used, the multiwalled carbon nanotubes were not dispersed, leading to no formation of a composite with the carbon nanofibers.

In Comparative Example 11, because of a principle in which a dispersion is sucked into the space between a rotor and a stator and the material to be dispersed is pulverized, neither dispersion of the multiwalled carbon nanotubes nor formation of a composite with the carbon nanofibers does not occur. Since aggregation of multiwalled carbon nanotubes proceeds, the same battery characteristics as in Comparative Example 8 were obtained.

In Comparative Example 12, a composite is partially formed by the cavitation effect of an ultrasonic homogenizer. However, it is difficult to uniformly form a composite from the material to be treated in the beaker, and thus leaving aggregate of the multiwalled carbon nanotubes.

The invention claimed is:

1. A method for producing composite carbon fibers, which comprises imparting a cavitation effect to slurry containing 6% by mass or less of two or more carbon fibers each having a different average fiber diameter under a pressure of 100 MPa or more and less than 245 MPa thereby to form a composite.

2. The method according to claim 1, wherein two or more carbon fibers each having a different average fiber diameter comprise carbon nanotubes having an average fiber diameter of 5 nm or more and 30 nm or less, and carbon nanofibers having an average fiber diameter of 50 nm or more and 300 nm or less.

3. The method according to claim 1, which further comprises imparting high-pressure shear to the slurry.

4. The method according to claim 3, wherein the method of imparting a cavitation effect and high-pressure shear to the slurry comprises a method of passing slurry through a nozzle under a high pressure.

5. The method according to claim 4, wherein the nozzle comprises a linear passage.

6. The method according to claim 4, wherein the number of the operation of passing the slurry through a nozzle is once or more and five times or less.

7. The method according to claim 5, wherein the number of the operation of passing the slurry through a nozzle is once or more and five times or less.

* * * * *